No. 864,926. PATENTED SEPT. 3, 1907.
E. C. SCHOONMAKER.
CELLULAR PNEUMATIC TIRE.
APPLICATION FILED NOV. 23, 1906.
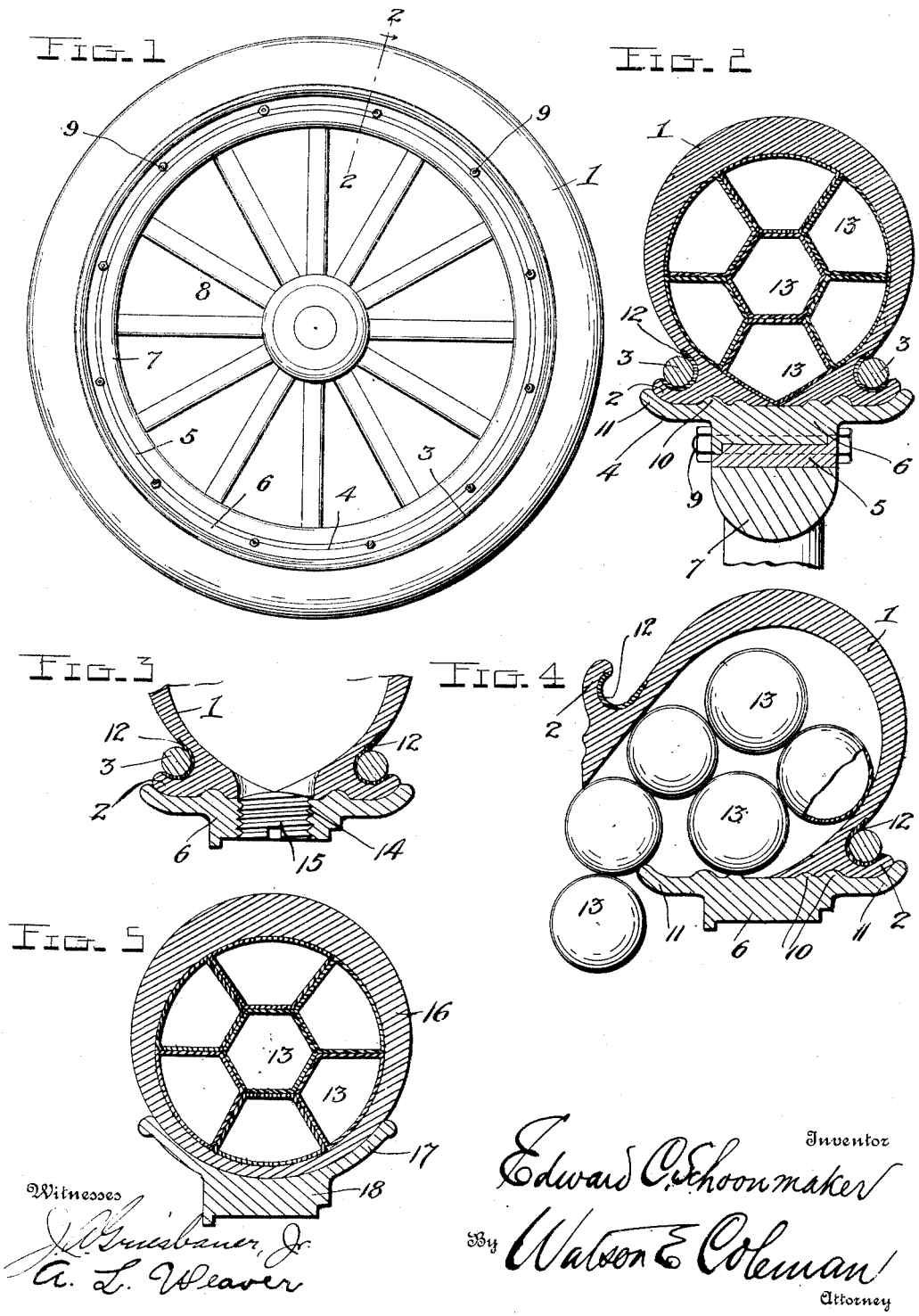

UNITED STATES PATENT OFFICE.

EDWARD C. SCHOONMAKER, OF PERHAM, MINNESOTA.

CELLULAR PNEUMATIC TIRE.

No. 864,926.　　　　　　Specification of Letters Patent.　　　　　　Patented Sept. 3, 1907.

Application filed November 23, 1906. Serial No. 344,723.

*To all whom it may concern:*

Be it known that I, EDWARD C. SCHOONMAKER, a citizen of the United States, residing at Perham, in the county of Ottertail and State of Minnesota, have invented certain new and useful Improvements in Cellular Pneumatic Tires, of which the following is a specification, reference being had therein to the accompanying drawing.

My invention relates to improvements in cellular, pneumatic tires and to an improved method for making the same.

One object of the invention is to provide a simple and practical tire of this character which will not be materially affected by punctures.

Another object of my invention is to improve and simplify the construction and the making of tires of this character and thereby render the same more durable and efficient.

Further objects and advantages of the invention, as well as the structural features by means of which these objects are attained, will be made clear by an examination of the following specification, taken in connection with the accompanying drawings, in which, Figure 1 is a side elevation of a wheel of an automobile or other vehicle equipped with my improved tire; Fig. 2 is a detail section, on an enlarged scale, taken on the plane indicated by the line 2—2 in Fig. 1; Fig. 3 is a detail cross section through the inner portion of the tire casing and the rim section which carries it, showing the opening through which the cellular bodies or balls are inserted in the tire casing; Fig. 4 is a detail cross section illustrating the manner in which the cellular bodies or balls may be removed from the tire casing; and Fig. 5 is a detail cross section through a slightly modified form of the invention.

My invention consists broadly in filling a tire casing with a large number of small balls or hollow bodies of rubber or other elastic material. These balls are filled with compressed air and hermetically sealed, and they are placed in a tire casing while under pressure sufficient to so reduce them in diameter as to enable them to be forced through a small opening in the tire casing. The latter is preferably air-tight and the pressure under which the balls are forced into the same, is greater than the pressure it is desired the tire to have after the filling operation has been completed and the filling opening closed. When the filling apparatus is disconnected the external pressure upon the balls or bodies is relieved and they expand within the tire casing and maintain a predetermined pressure within the same. This pressure may be varied by varying the number of balls inserted in the tire, or by varying the degree of inflation of the balls, or both. In practice, I found that about eight hundred balls of three and one-half inches in diameter, when subjected to a pressure of about seventy-five pounds to the square inch, in which condition they are less than one inch in diameter, will fill a 30×3½ inch tire so that when the filling apparatus is disconnected the balls will expand and maintain a pressure of about sixty pounds in the tire. In a tire of this character the puncture of one or even a large number of the balls or cellular bodies will not materially affect the general pressure in the tire.

The preferred embodiment of my invention shown in the accompanying drawings, comprises a tire casing 1 somewhat similar in form to the outer tubes or casings of tires now in general use. This casing 1 is of rubber and preferably has canvas or other fabric embedded in it to resist puncture. It is open around its inside and at its edges are formed outwardly projecting annular flanges 2 which provide curved seats for the reception of fastening rings or bands 3 which secure it to the rim 4. The latter is here shown as consisting of inner and outer detachable sections 5, 6, the inner one of which is suitably secured upon the felly 7 of the wheel 8 and the outer one of which carries the tire 1. The outer rim section or member 6 is adapted to slide over and upon the inner one 5 and be retained thereon by transverse fastening bolts 9, as clearly shown in Figs. 1 and 2 of the drawings; but it will be understood that a rim of any other form and construction may be used in connection with my improved tire. The outer rim member or section 6 has upon its outer face annular ribs 10 to seat in annular grooves formed in the edges of the tire 1 and from its sides project outwardly-curved, annular flanges 11 to which the flanges 2 of the tire are secured by the metal rings or bands 3. These fastening bands 3 are made from one-half to one inch smaller in circumference than that of the curved seats in the flanges 2 and they are shrunk upon said parts in the following manner. The bands 3 are heated by a current of electricity until they are of sufficient size to slip into the seats in the tire flanges 2 and when cool they shrink sufficiently to hold the tire securely upon the rim flanges 11 and also to render the tire air tight.

In order to prevent the rubber on the tire from being injured by the heat generated in the rings or bands 3, I preferably embed in the tire flanges 2, asbestos cloth, as clearly shown at 12 in Figs. 2 and 4 of the drawings. After the tire 1 has been thus secured upon the outer, removable rim section or member 6, it is filled with the cellular bodies or balls 13 through the filling opening 14 arranged at a suitable point in the rim member 6, as shown in Fig. 3. This opening 14 is preferably screw-threaded so that it may be closed by a threaded plug 15 after a sufficient number of balls or bodies have been forced into the tire casing and the filling apparatus is disconnected. In filling the tire, the balls or bodies 13 which, when not under pressure, are preferably about three and one-half inches in diameter, are placed in an air tight receptacle having a discharge that may be connected to the filling opening 14. The pressure in this receptacle or chamber is then raised to about seventy-five pounds to the square inch whereupon the balls 13 become sufficiently small in diameter to permit them to be readily forced into the tire casing 1. After the proper number of balls have been forced into the latter, the filling apparatus is disconnected and the opening 14 closed by the plug 15. When the filling apparatus is disconnected the balls or spheres 13 expand and assume positions, substantially as shown in Fig. 2. Should it be desired to remove the balls from the tire, the latter is placed in an air tight chamber and the pressure in the same is brought up to within a few pounds of that existing inside of the tire. Electric connections are then made with one of the rings or fastening bands 3 so that the latter expands and permits the pressure within the tire to force one of its sides outwardly and thus enable all of the balls to leave the tire casing, as shown in Fig. 4 of the drawings.

In Fig. 5 of the drawing is shown a rubber tire 16 of well known form adapted to be cemented or otherwise secured in the seat or groove formed by the outwardly flaring flanges 17 of a rim section 18. Its tire 16 is filled in a manner similar to that shown in Fig. 3, but no provision is made for removing the balls or bodies from it.

The construction and manner of practicing my invention will be readily understood from the foregoing description taken in connection with the accompanying drawings.

It will be noted that by filling a tire casing with cellular bodies of the character described it will not be materially affected by even a great number of punctures, and that it will only be thrown out of use by its total destruction. By having the tire 1 secured upon the outer rim section 6, it may be quickly removed from the wheel and a new one may be substituted, thus obviating the necessity of stopping to repair injured tires while on the road.

While I have shown and described the preferred embodiment and manner of practicing my invention, it will be understood that I do not wish to be limited to the precise details herein set forth and that various changes may be made without departing from the spirit of the invention as defined by the appended claims.

Having thus described my invention, what I claim as new and desire to secure by Letters Patent of the United States is:—

1. A tire of the character described comprising a rim section having annular side flanges, a tire provided with similar flanges to engage the flanges of the rim section, non-heat conducting material upon the flanges of the tire and metallic fastening bands shrunk upon the tire flanges for clamping the latter to the rim flanges, said bands being engaged with said non-heat conducting material to prevent the heat generated in the bands from injuring the tire, substantially as set forth.

2. A tire of the character described comprising a rim section having annular flanges, a tire casing open around its inner side and having its edges formed with flanges to engage said flanges of the rim section, said flanges being formed with seats, a non-heat-conducting material embedded in said seats, metallic fastening bands shrunk in said seats for fastening said tire flanges upon said rim section flanges, and a filling for said tire casing.

3. A tire of the character described comprising a rim section formed with outwardly curved flanges, a tire casing open around its inside and formed at its edges with flanges, the latter forming curved seats and having asbestos fabric embedded therein, metallic bands shrunk in said seats for clamping said tire flanges upon said rim section flanges, cellular bodies of elastic material filled with compressed air arranged in said tire casing to fill its entire space, said rim section being formed with a threaded opening communicating with the interior of said casing to permit of the insertion of said bodies, and a screw plug inclosing said threaded opening in the rim section, substantially as described.

In testimony whereof I hereunto affix my signature in presence of two witnesses.

EDWARD C. SCHOONMAKER.

Witnesses:
B. L. KEMPER,
K. D. SCHOONMAKER.